(12) United States Patent
Otsuka et al.

(10) Patent No.: US 10,022,926 B2
(45) Date of Patent: Jul. 17, 2018

(54) INJECTION MOLDING METHOD AND INJECTION MOLDING DIE

(71) Applicant: OLYMPUS CORPORATION, Shibuya-ku, Tokyo (JP)

(72) Inventors: Masaki Otsuka, Hino (JP); Koki Iwasawa, Akiruno (JP); Shigeya Sugata, Hachioji (JP); Yoshitaka Otsuka, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 83 days.

(21) Appl. No.: 14/996,044

(22) Filed: Jan. 14, 2016

(65) Prior Publication Data

US 2016/0129649 A1    May 12, 2016

Related U.S. Application Data

(63) Continuation of application No. PCT/JP2014/074900, filed on Sep. 19, 2014.

(30) Foreign Application Priority Data

Sep. 24, 2013   (JP) .................................. 2013-197567

(51) Int. Cl.
*B29D 11/00* (2006.01)
*B29C 45/73* (2006.01)
(Continued)

(52) U.S. Cl.
CPC .... *B29D 11/00538* (2013.01); *B29C 45/0025* (2013.01); *B29C 45/18* (2013.01);
(Continued)

(58) Field of Classification Search
CPC ........ B29D 11/00538; B29D 11/00432; B29C 45/0025; B29C 45/2708; B29C 45/18
See application file for complete search history.

(56) References Cited

U.S. PATENT DOCUMENTS

2012/0323078 A1   12/2012   Kikumori et al.

FOREIGN PATENT DOCUMENTS

CN      101980848 A    2/2011
CN      102791457 A   11/2012
(Continued)

OTHER PUBLICATIONS

Chinese Office Action (and English translation thereof) dated Jan. 19, 2017, issued in counterpart Chinese Application No. 201480039476.4.

(Continued)

*Primary Examiner* — Mathieu Vargot
(74) *Attorney, Agent, or Firm* — Holtz, Holtz & Volek PC

(57) ABSTRACT

An injection molding method includes a supply step of simultaneously supplying molten resins to a cavity portion from two gate portions and an associating step of associating the molten resins supplied from the two gate portions in a central part of the cavity portion. The supply step supplies the molten resins to the cavity portion from the two gate portions which substantially face each other around the cavity portion. The associating step includes at least one of a first step in the supply step of simultaneously starting the supply of the molten resins to the cavity portion from the two gate portions, and a second step in the supply step of simultaneously starting the injection of the molten resins into the cavity portion from the two gate portions at the same injection rate.

2 Claims, 8 Drawing Sheets

(51) Int. Cl.
*B29C 45/27* (2006.01)
*B29C 45/00* (2006.01)
*B29C 45/18* (2006.01)

(52) U.S. Cl.
CPC .... *B29C 45/2708* (2013.01); *B29D 11/00432* (2013.01); *B29C 45/0046* (2013.01); *B29K 2909/08* (2013.01); *B29K 2995/0015* (2013.01)

(56) References Cited

FOREIGN PATENT DOCUMENTS

| | | | |
|---|---|---|---|
| JP | 06091702 | A | 4/1994 |
| JP | 07227882 | A | 8/1995 |
| JP | 2006272871 | A | 10/2006 |
| TW | 200843932 | A | 11/2008 |
| WO | 2009122862 | A1 | 10/2009 |
| WO | 2011111242 | A1 | 9/2011 |

OTHER PUBLICATIONS

International Search Report (ISR) dated Nov. 18, 2014 issued in International Application No. PCT/JP2014/074900.
International Preliminary Report on Patentability (IPRP) including Written Opinion (in English) dated Apr. 7, 2016, issued in International Application No. PCT/JP2014/074900.
Taiwanese Office Action (and English translation thereof) dated Aug. 24, 2016, issued in counterpart Taiwanese Application No. 103133017.
Chinese Office Action dated Sep. 14, 2017 issued in counterpart Chinese Application No. 201480039476.4.
Japanese Office Action dated Feb. 20, 2018 issued in counterpart Japanese application No. 2015-539170.
Chinese Office Action dated Mar. 21, 2018 issued in counterpart Chinese Application No. 201480039476.4.

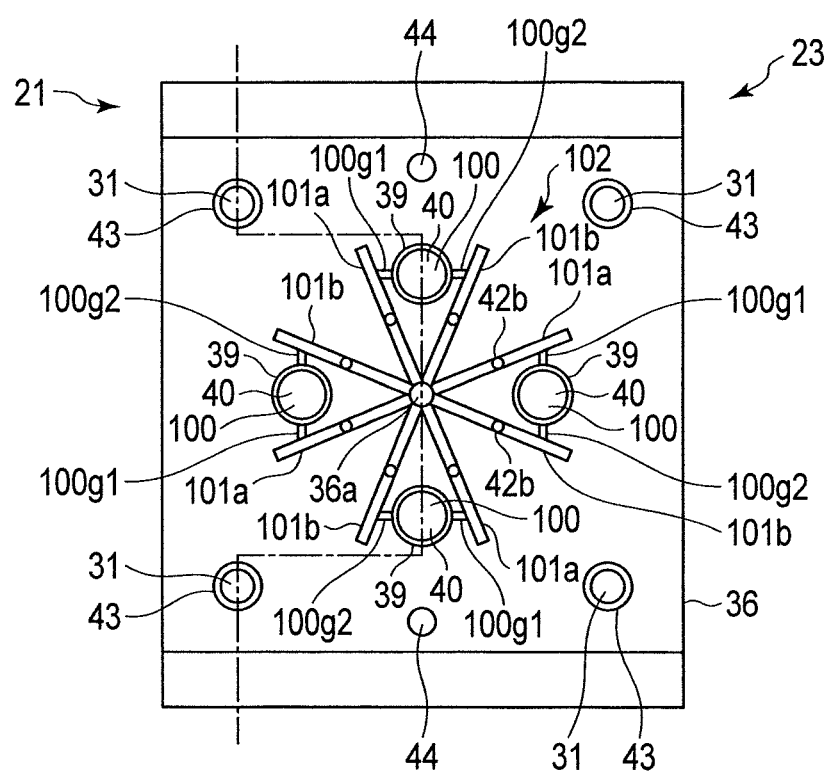
F I G. 2

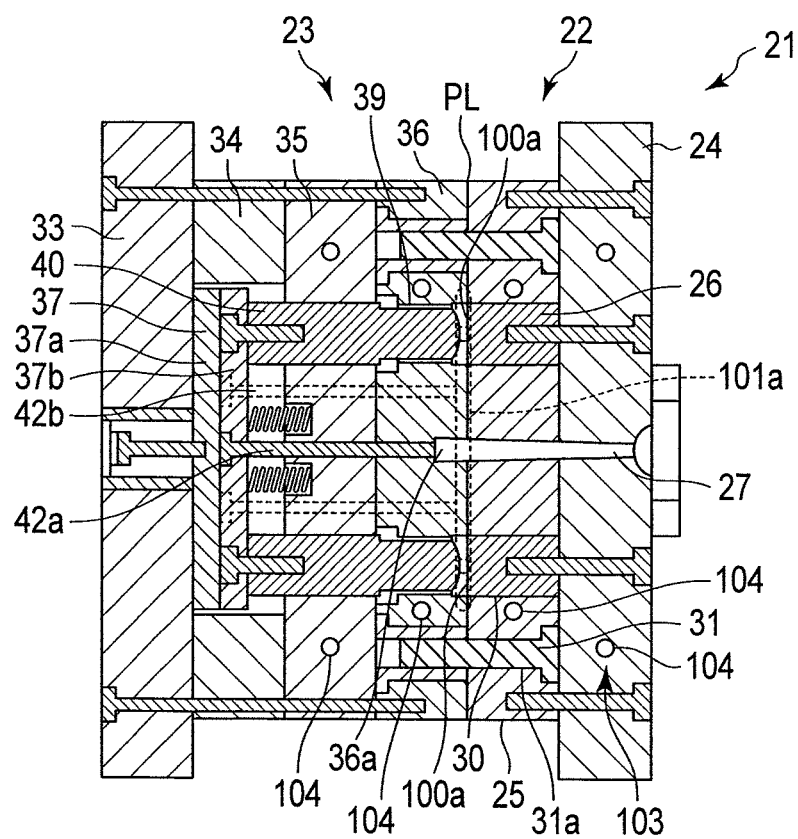
F I G. 3

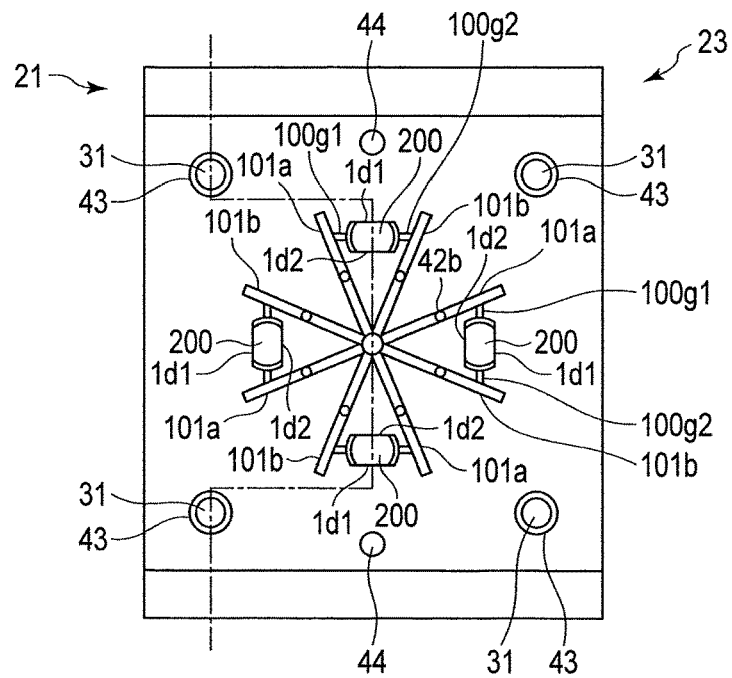
F I G. 6
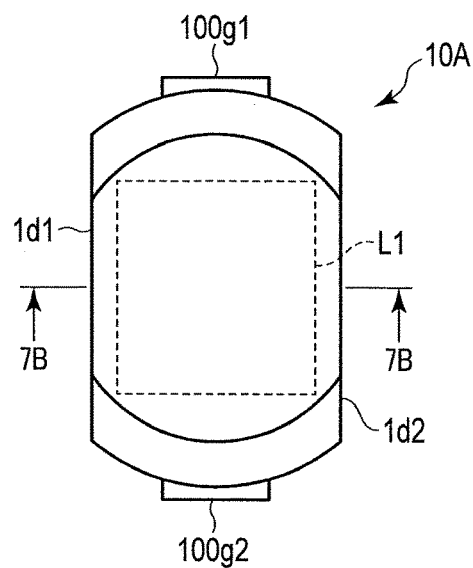
F I G. 7A

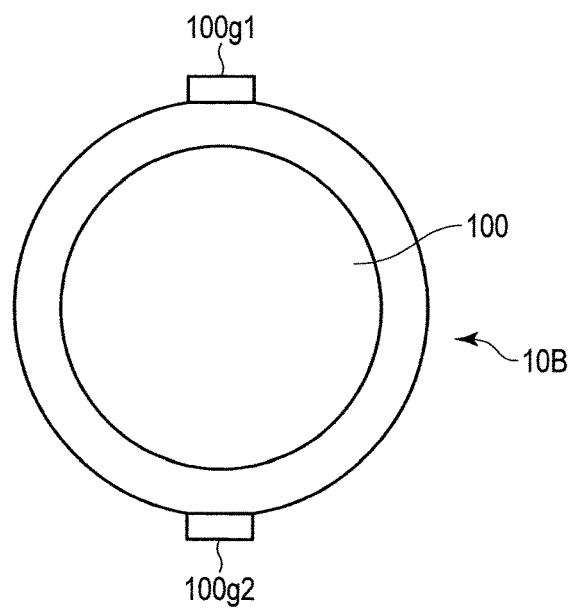
F I G. 9
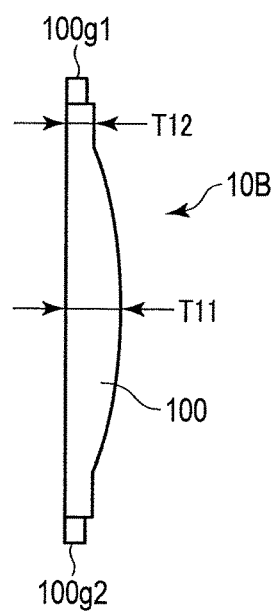
F I G. 10

INJECTION MOLDING METHOD AND INJECTION MOLDING DIE

CROSS-REFERENCE TO RELATED APPLICATIONS

This application is a Continuation Application of PCT Application No. PCT/JP2014/074900, filed Sep. 19, 2014 and based upon and claiming the benefit of priority from prior Japanese Patent Application No. 2013-197567, filed Sep. 24, 2013, the entire contents of all of which are incorporated herein by reference.

BACKGROUND OF THE INVENTION

1. Field of the Invention

The present invention relates to an injection molding method and an injection molding die.

2. Description of the Related Art

In a general injection molding die, a molten resin in a high-temperature state is injected from an injection molding machine, and supplied to a runner via a sprue formed in a fixed die. The molten resin is then supplied to a cavity portion of a die from a distal end portion of the runner through a gate portion. Here, when a molded article is a resin lens, the temperature of the molten resin is set much higher than the glass transition point temperature of the molten resin so that the molten resin has fluidity.

The thickness of the lens in optical axis direction generally varies between a center portion of the lens and an outer circumferential part of the lens. For example, in a concave lens, a center portion of the lens is thinner than an outer circumferential part of the lens. For example, in a convex lens, a center portion of the lens is thicker than an outer circumferential part of the lens. The flow of the molten resin in the cavity portion tends to change depending on the change of the thickness along the optical axis direction.

For example, when the molten resin is in contact with an inner surface of the cavity portion, and the temperature of the inner surface of the cavity portion is lower than the glass transition point temperature of the molten resin, in which case the heat of the molten resin is conducted to the die from one part of the molten resin which is in close contact with the inner surface of the cavity portion. Thus, the fluidity of the side of the molten resin which is in close contact with the inner surface of the cavity portion becomes lower. In contrast, at a position located away from the inner surface of the cavity portion, heat conduction is inhibited by the molten resin existing between another part of the molten resin which is located away and the inner surface of the cavity portion. Thus, the fluidity of the molten resin is maintained. Therefore, in the cavity portion of the injection molding die for the lens in which the thickness in the optical axis direction varies between the center portion of the lens and the outer circumferential part of the lens, a better condition of the fluidity of the molten resin tends to be maintained in the thicker parts of the cavity portion in the optical axis direction than in thinner parts. As a result, the flow velocity of the molten resin running through the thicker parts is higher than the flow velocity of the molten resin running through the thinner parts. The flow velocity of the molten resin is lower when the thickness of the cavity portion (i.e., the distance between the inner surfaces) is smaller, and in an extreme case, there is a fear that the molten resin may stop without flowing. If the molten resin stops in the cavity portion, the molten resin releases heat to the die and immediately cures.

Thus, in the molten resins which have flowed into the cavity portion from the gate portion, a molten resin A flowing in the thin parts of the cavity portion extremely slowly flows or is stopped. In contrast, a molten resin B flowing in the thick parts of the cavity portion flows in such a manner as to avoid the molten resin A. This molten resin B then flows to the side of one part of the cavity portion located opposite to the gate portion around the molten resin A. In this instance, the molten resin B flows back to the void part resulting from the molten resin A that has stopped, and there is a possibility that the void part may be filled with the molten resin B. When the molten resins A and B which are different in flowing direction are associated in the cavity portion, there is a strong possibility that the molten resins A and B which have flowed while being decreased in temperature and have been associated with each other may not be homogeneously unified and weld lines may thus be generated. Between the molten resin A and the molten resin B in particular, the molten resin A may cure to some degree as described above, and weld lines are generated.

For example, in the cavity portion of the concave lens, the center portion of the lens is thinner than the outer circumferential part of the lens. Thus, in the molten resins which have flowed into the cavity portion from the part of the gate portion side, the flow velocity of the molten resin running through the center portion of the lens is lower than the flow velocity of the molten resin running through the outer circumferential part of the lens. This phenomenon becomes more evident from a point near the central line and thereafter in the cavity portion. When an uneven thickness degree M (M=T2/T1) which is the ratio between a thickness T1 of the center portion of the lens and a thickness T2 of the outer circumferential part of the lens is high (e.g., M is 4 or more), in the molten resin which has flowed into the cavity portion from the part of the gate portion side, there occurs a phenomenon in which the head portion (flow front portion) of the molten resin which has passed the right side of the center portion of the lens and the head portion of the molten resin which has passed the left side of the center portion of the lens associate with each other ahead of the center portion of the lens. In this case, air collects in the cavity portion by this association, and parts that are not transferred to the injection molding die and weld lines are generated, thus the appearance of the molding becomes defective.

In the convex lens, the thickness T2 of the outer circumferential part of the lens is smaller than the thickness T1 of the center of the lens (T2<T1). Therefore, the opening area of the gate portion through which the molten resin flows into the cavity portion is smaller. A lens diameter D is substantially equal to a flow length L of the molten resin in the cavity portion. When the lens diameter D is greater than a lens thickness T (e.g., L/T<25), the viscosity of the molten resin which is filling the cavity portion rapidly increases, thus the resin pressure of the molten resin is not transmitted to the vicinity of the end (the side opposite to the gate portion) of the cavity portion, leading to insufficient filling with the molten resin. Thus, air collects in the vicinity of the end of the cavity portion, and parts that are not transferred to the injection molding die are generated, thus the shape accuracy may deteriorate.

For example, in Jpn. Pat. Appln. KOKAI Publication No. 2006-272871, a depressed portion is provided along the circumferential part in the cavity portion as a measure to prevent the generation of weld lines in the concave lens, and the molten resin flowing along the circumferential part in the cavity portion flows into the depressed portion so that a protruding portion thus formed is disposed. Therefore, in the molten resins which have flowed into the cavity portion from the gate portion, the time difference is reduced between the arrival time of the molten resin flowing into the side opposite of the gate portion via the center portion of the lens and the arrival time of the molten resin flowing into the side opposite of the gate portion from the gate portion around the circumferential part. Consequently, the generation of weld lines in effective optical surface of the lens is prevented.

BRIEF SUMMARY OF THE INVENTION

An aspect of an injection molding method of the present invention is an injection molding method of supplying molten resins to a cavity portion and molding a lens in which the thickness of a lens center portion of the lens is different from the thickness of a circumferential portion thereof, the injection molding method including a supply step of simultaneously supplying the molten resins to the cavity portion from two gate portions which are provided around the cavity portion and which are connected to the cavity portion; and an associating step of associating the molten resins supplied from the two gate portions in a central part of the cavity portion, wherein the supply step supplies the molten resins to the cavity portion from the two gate portions which substantially face each other around the cavity portion, and the associating step includes at least one of a first step in the supply step of simultaneously starting the supply of the molten resins to the cavity portion from the two gate portions, and a second step in the supply step of simultaneously starting the injection of the molten resins into the cavity portion from the two gate portions at the same injection rate.

An aspect of an injection molding die of the present invention is an injection molding die having a cavity portion to mold a lens in which the thickness of a lens center portion of the lens is different from the thickness of a circumferential portion thereof, molten resins in a high-temperature state being supplied to the cavity portion to mold the lens, the injection molding die including two gate portions which are connected to the cavity portion and which simultaneously supply the molten resins to the cavity portion; and a associating mechanism which associates the molten resins supplied from the two gate portions in a central part of the cavity portion, wherein a molding portion in the cavity portion to mold an optical effective surface of the lens is formed by a bushing that uses glass as a low-thermal-conductivity material.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a plan view showing a PL surface of a movable die of the injection molding die according to the first embodiment;

FIG. 3 is a longitudinal sectional view showing a mold clamp state of the injection molding die according to the first embodiment;

FIG. 6 is a plan view showing the PL surface of the movable die of the injection molding die according to a second embodiment of the present invention;

FIG. 7A is a plan view showing the configuration of the circumferential portion of the cavity portion of the injection molding die according to the second embodiment;

FIG. 9 is a plan view showing how the gate portion of the injection molding die according to a third embodiment of the present invention is disposed; and FIG. 10 is a longitudinal sectional view showing the configuration of the circumferential portion of the cavity portion of the injection molding die according to the third embodiment.

DETAILED DESCRIPTION OF THE INVENTION

Hereinafter, embodiments of the present invention will be described in detail with reference to the drawings. In some of the drawings, some components are not shown for clarity of illustration.

First Embodiment

[Configuration]

The first embodiment is described with reference to FIG. 1A, FIG. 1B, FIG. 2, FIG. 3, FIG. 4, and FIG. 5.

[Concave Lens 1]

Figure 1A:
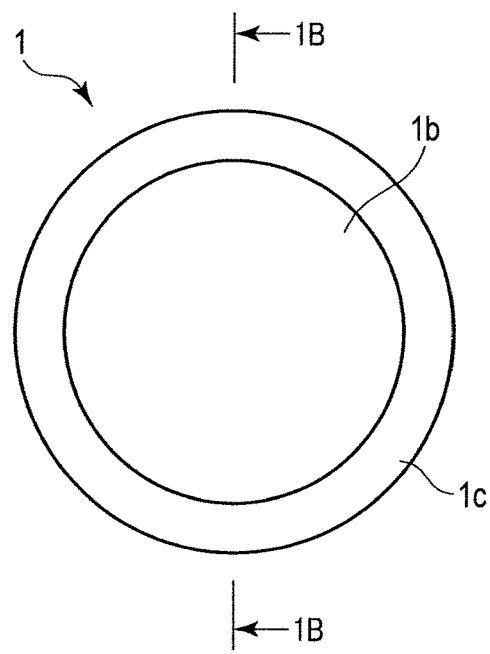
FIG. 1A is a top view of a concave lens which is a molded article that is molded in an injection molding die according to a first embodiment of the present invention.
Figure 1B:
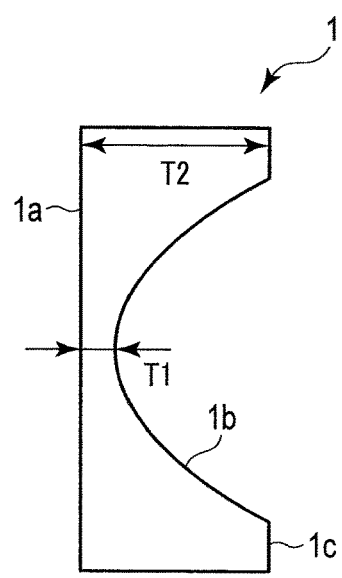
FIG. 1B is a sectional view taken along the 1B-1B line shown in FIG. 1A.

As shown in FIG. 1B, a concave lens 1 which is a molded article has a first lens surface 1a which is a flat surface formed on one surface side of the concave lens 1, and a second lens surface 1b which is a concavely curved surface formed on the other surface side of the concave lens 1. Thus, in the concave lens 1, the thickness of a lens center portion of the lens and the thickness of a circumferential portion thereof are different from each other. In the concave lens 1, an uneven thickness degree M (M=T2/T1) which is the ratio between a thickness T1 of the center portion of the concave lens 1 and a thickness T2 of the outer circumferential part of the concave lens 1 is high thus the uneven thickness degree M is 4 or more. The concave lens 1 further has a planar flange portion 1c formed in an outer circumferential part of the second lens surface 1b. The above-mentioned thickness T2 of the outer circumferential part of the concave lens 1 corresponds to the thickness of the whole flange portion 1c. The concave lens 1 is molded by the injection molding of a transparent resin material. The transparent resin material includes, for example, polycarbonate (PC). The resin material has fusibility. The resin material is a molten resin which is a molding material of the concave lens 1 (molded article). Thus, the concave lens 1 functions as a resin lens. The molded article has only to be an optical element.

[Injection Molding Die 21]

As shown in FIG. 2, an injection molding die 21 has a four-cavity configuration in which multiple (e.g., four) concave lenses 1 are simultaneously injection-molded in one molding. As shown in FIG. 3, the injection molding die 21 has a fixed die 22 and a movable die 23. The fixed die 22 and the movable die 23 are respectively attached to platens of an unshown injection molding machine. Here, the fixed die 22 and the movable die 23 are arranged to face each other across a parting line (hereinafter referred to as a PL). The movable die 23 is supported movably relative to the fixed die 22 in a die open-close direction (a horizontal direction in FIG. 3).

When the movable die 23 is combined with the fixed die 22 in a die close state as shown in FIG. 3, a cavity portion 100 to mold the concave lens 1 in which the thickness of the lens center portion and the thickness of the circumferential part are different from each other is formed as shown in FIG. 2. Four cavity portions 100 are simultaneously formed. Although described in detail later, a molten resin in a high-temperature state is supplied to the cavity portions 100 to mold the concave lenses 1.

[Fixed Die 22]

Figure 5:
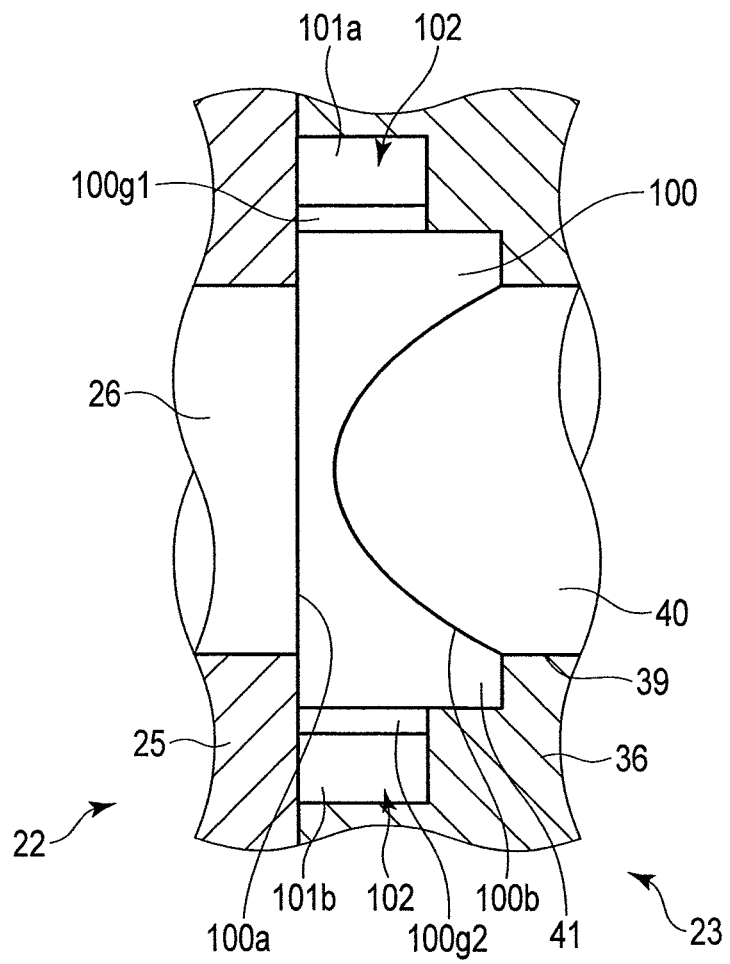
FIG. 5 is a longitudinal sectional view showing the configuration of a circumferential portion of a cavity portion of the injection molding die according to the first embodiment.

As shown in FIG. 3, the fixed die 22 has a fixing side attachment plate 24, a fixing side template 25, and four fixing side bushings 26 which are specular pieces (fixing side molding dies). The fixing side template 25 is fixed to the fixing side attachment plate 24 so that the fixing side template 25 overlaps the fixing side attachment plate 24. The four fixing side bushings 26 are substantially shaft-like members. The fixing side bushings 26 are made of a low-thermal-conductivity material such as glass (S-BSL7 (OHARA, linear expansion coefficient: 86×10−7, glass yield point: 625° C.)) shown in Japanese Patent No. 4751818. As shown in FIG. 5, the fixing side bushing 26 has a planar first transfer portion 100a which is formed at a distal end of the fixing side bushing 26 and which transfers the first lens surface 1a to the resin material for molding the concave lens 1. The first transfer portion 100a functions as a molding portion in the cavity portion 100 to mold the first lens surface 1a which is an optical effective surface of the concave lens 1.

As shown in FIG. 3, the fixed die 22 further has a sprue 27 as a flow path portion which is disposed in a center of the fixed die 22 and which supplies the molten resin to the cavity portion 100 and through which the molten resin flows for supply. The sprue 27 has a circular hole shape. The sprue 27 is provided through the fixing side attachment plate 24 and the fixing side template 25. As shown in FIG. 2, the four cavity portions 100 are arranged an equal distance apart from the sprue 27.

As shown in FIG. 3, the fixing side template 25 has four fixing side bushing insertion hole portions 30 in which the fixing side bushings 26 functioning as the fixing side molding dies are inserted. The fixing side bushing insertion hole portions 30 face the movable die 23. The fixing side bushings 26 are movable in the fixing side bushing insertion hole portions 30 along the axial directions of the fixing side bushings 26. The fixing side template 25 further has four fixing side guide pin insertion hole portions 31a and two unshown fixing side positioning pin insertion hole portions. Fixing side guide pins 31 are inserted through the four fixing side guide pin insertion hole portions 31a, respectively. Unshown fixing side positioning pins are inserted through the two fixing side positioning pin insertion hole portions, respectively. Here, a clearance portion is formed between the fixing side bushing insertion hole portion 30 and the fixing side bushing 26, and the fixing side bushing insertion hole portion 30 and the fixing side bushing 26 are out of contact with each other. The fixing side positioning pins are pressed in the fixing side positioning pin insertion hole portions. The proximal end portions of the fixing side bushings 26 and the fixing side positioning pins are fixed to the fixing side template 25 by fixing screws.

[Movable Die 23]

The movable die 23 has a movable side attachment plate 33, a spacer block 34, a movable side support plate 35, a movable side template 36, and four movable side bushings 40. Here, the spacer block 34 and the movable side support plate 35 are fixed to the movable side attachment plate 33 that the spacer block 34 and the movable side support plate 35 overlap the movable side attachment plate 33. The four movable side bushings 40 are substantially shaft-like members. As shown in FIG. 5, the movable side bushing 40 has a second transfer portion 100b having a convexly curved surface which is formed at a distal end of the movable side bushing 40 and which transfers the second lens surface 1b to the resin material for molding the concave lens 1.

As shown in FIG. 2, the movable die 23 has a circular depressed portion 36a provided at the central position of the movable die 23 and in the movable side template 36. The circular depressed portion 36a is provided coaxially with the sprue 27. The movable side template 36 has four movable side bushing insertion hole portions 39 through which the movable side bushings 40 are inserted, four guide bushes 43 into which the four fixing side guide pins 31 are inserted, and two movable side positioning pins 44. The movable side bushing insertion hole portions 39 face the fixed die 22. The four movable side bushing insertion hole portions 39 are disposed at positions to face the four fixing side bushing insertion hole portions 30. The movable side bushings 40 are movable in the movable side bushing insertion hole portions 39 along the axial directions of the movable side bushings 40. The movable side bushings 40 as well as the fixing side bushings 26 are made of a low-thermal-conductivity material such as glass (S-BSL7 (OHARA, linear expansion coefficient: 86×10−7, glass yield point: 625° C.)) shown in Japanese Patent No. 4751818. Here, a clearance portion is formed between the movable side bushing insertion hole portion 39 and the movable side bushing 40, and the movable side bushing insertion hole portion 39 and the movable side bushing 40 are out of contact with each other. The movable side positioning pins 44 are pressed in unshown movable side positioning pin insertion hole portions.

As shown in FIG. 5, the movable side template 36 has ring-shaped flange portion forming depressed portions 41 which is formed around an opening end of each of the movable side bushing insertion hole portions 39 and which forms a flange 1c.

The cavity portion 100 is formed by the flange portion forming depressed portion 41 of the movable side template 36, the second transfer portion 100b of the movable side bushing 40, the circumferential part of the four fixing side bushing insertion hole portions 30 of the fixing side template 25, and the first transfer portion 100a of the fixing side bushing 26.

As shown in FIG. 5, in the present embodiment, the injection molding die 21 has two gate portions (a first gate portion 100g1 and a second gate portion 100g2) which are provided around the four cavity portions 100, which are connected to the cavity portions 100 and which simultaneously supply the molten resins to the four cavity portions 100. The first gate portion 100g1 and the second gate portion 100g2 are formed in a circumferential wall surface of the flange portion forming depressed portion 41. The first gate portion 100g1 and the second gate portion 100g2 supply the molten resins to the cavity portion 100 so that the opening areas of their inlets for the molten resins toward the cavity portion 100 side are equal to each other and the flow volumes and flow velocities of the molten resins toward the cavity portion 100 side are equal to each other.

Figure 4:
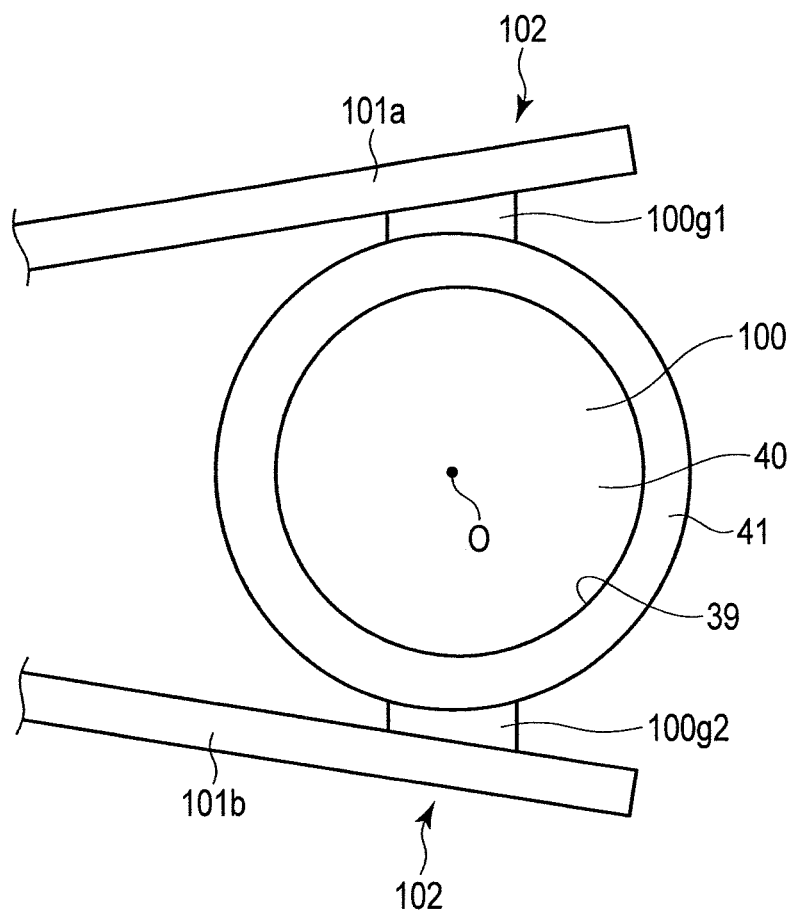
FIG. 4 is a plan view showing how a gate portion of the injection molding die according to the first embodiment is disposed.

As shown in FIG. 4, the first gate portion 100g1 and the second gate portion 100g2 substantially face each other around the cavity portion 100. In other words, the first gate portion 100g1 is located substantially 180° apart from the second gate portion 100g2 in the circumferential direction from a central position O of the cavity portion 100. The first gate portion 100g1 is coupled to a distal end portion of a runner 101a, and the second gate portion 100g2 is coupled to a distal end portion of a runner 101b different from the runner 101a. The proximal end portions of the runners 101a and 101b are coupled to the circular depressed portion 36a. Thus, as shown in FIG. 4, in the movable side template 36, eight runners 101a and 101b are arranged radially from the circular depressed portion 36a around the circular depressed portion 36a. The eight runners 101a and 101b are point-symmetric around the central axis of the circular depressed portion 36a in all directions, and are equal in shape to one another.

In the first gate portion 100g1 and the second gate portion 100g2, the opening areas of their outlets for the molten resin to the cavity portions 100 are preferably equal to each other. The length of a supply path of the molten resin which flows into the cavity portion 100 from the circular depressed portion 36a via the runner 101a and the first gate portion 100g1 is preferably equal to the length of a supply path of the molten resin which flows into the cavity portion 100 from the circular depressed portion 36a via the runner 101b and the second gate portion 100g2. Thus, associating mechanism 102 which associates the molten resins in the cavity portion 100 is formed. This associating mechanism 102 associates the molten resins supplied from the first gate portion 100g1 and the second gate portion 100g2 in the central part of the cavity portion 100 after the molten resins are simultaneously supplied to the cavity portion 100 respectively from the first gate portion 100g1 and the second gate portion 100g2 disposed around the cavity portion 100. In other words, the first gate portion 100g1 and the second gate portion 100g2 supply the molten resins so that the molten resins supplied from the first gate portion 100g1 and the second gate portion 100g2 are associated with each other in the central part of the cavity portion 100. The associating mechanism 102 associates the molten resins by at least one of the following: the first gate portion 100g1 and the second gate portion 100g2 simultaneously starting the supply of the molten resins to the cavity portion 100, and the first gate portion 100g1 and the second gate portion 100g2 starting the injection of the molten resins into the cavity portion 100 at the same injection rate.

As shown in FIG. 3, the injection molding die 21 further has an ejector plate 37 which is provided inside the spacer block 34 and which constitutes an ejection mechanism to take out the concave lens 1. The ejector plate 37 is provided to be able to come in and out of contact with the movable side attachment plate 33. The ejector plate 37 has a lower ejector plate 37a and an upper ejector plate 37b. Ejector pins (a center pin 42a and eight ejector pins 42b) and a proximal end portion of the movable side bushing 40 are attached to the upper ejector plate 37b. The center pin 42a is provided at the central position of the ejector plate 37, and is further provided at a position corresponding to the circular depressed portion 36a. The eight ejector pins 42b are provided around the center pin 42a, and are provided at positions corresponding to the runners 101a and 101b. The ejector plate 37 is moved in a direction (die close direction) opposite to the die open direction of the movable die 23 after the concave lens 1 is formed. In response to this movement of the ejector plate 37, the center pin 42a ejects the circular depressed portion 36a, and the eight ejector pins 42b eject the runners 101a and 101b. Moreover, the movable side bushing 40 ejects the cavity portion 100. Thus, the concave lens 1 provided in the movable die 23 is taken out.

The injection molding die 21 according to the present embodiment also has a heating portion 103 which heats the injection molding die 21 at a proper temperature to inhibit the temperature drop of the molten resins. This heating portion 103 has temperature adjustment pipes 104 that are respectively inserted through, for example, the fixing side attachment plate 24, the fixing side template 25, the movable side support plate 35, and the movable side template 36. Temperature-adjusted fluids flow through the temperature adjustment pipes 104. The heating portion 103 may have a heater.

Although the injection molding die 21 having the four-cavity configuration in which one sprue 27 and four cavity portions 100 are provided and in which four molded articles are injection-molded is shown in the present embodiment, the number of molding cavities is not limited to four. The injection molding die 21 may have a multicavity configuration other than the four-cavity configuration or may have a single-cavity configuration.

(Functions)

The molten resin is injected from an injection nozzle of the unshown injection molding machine, and supplied to the circular depressed portion 36a through the sprue 27. The molten resin flows into the eight radially arranged runners 101a and 101b from the circular depressed portion 36a. Further, the molten resin is supplied to the cavity portion 100 from the distal end portions of the respective runners 101a and 101b through the first gate portion 100g1 and the second gate portion 100g2.

The eight runners 101a and 101b are point-symmetric around the central axis of the circular depressed portion 36a in all directions, and are equal in shape to one another. Thus, the molten resins which have flowed into the eight runners 101a and 101b flow at the same velocity in all the runners. The molten resins are then equally distributed to each of the cavity portions 100 from the runners 101a and 101b, and simultaneously supplied to each of the cavity portions 100 from the first gate portion 100g1 and the second gate portion 100g2 that substantially face each other. In this instance, the temperature adjustment pipes 104 heat the injection molding die 21 so that rapid cooling of the molten resin is prevented, and the molten resin flows while being slowly cooled.

When the molten resins are supplied to the cavity portion 100 from the first gate portion 100g1 and the second gate portion 100*g*2, the molten resins flow toward the central part of the cavity portion 100 from the side of the circumferential part of the cavity portion 100 and from two directions which face each other. The flow velocities and flow volumes of the molten resins flowing from the two directions in this instance are substantially equal to each other. Thus, the head portions (flow front portions) of the two molten resins flowing toward the central part of the cavity portion 100 from the first gate portion 100*g*1 and the second gate portion 100*g*2 associate with each other in the central part of the cavity portion 100. In this instance, the molten resins associate on the fixing side bushing 26 that uses glass as low-thermal-conductivity materials. Thus, the molten resins that contact the first transfer portion 100*a* and the second transfer portion 100*b* are kept in a high-temperature state. Therefore, the head portions (flow front portions) of the molten resins associated in the central part of the cavity portion 100 are fused and then unified without separating. When the material of the fixing side bushing 26 is a steel material, the temperature adjustment pipes 104 and the heating portion 103 having the heater heat the molding portion (the first transfer portion 100*a*) in the cavity portion 100 for the optical effective surface (the first lens surface 1*a*) to a state 30 degrees or more higher than the glass transition point of the molten resins. The head portions of the molten resins associate with each other in this state so that the head portions are fused and then unified without separating as described above.

When the molten resins contact the first transfer portion 100*a* and the second transfer portion 100*b*, the molten resins are subjected to transfer pressure at a temperature at which the molten resins can be deformed. This ensures that the molten resins in the cavity portion 100 come into close contact with the first transfer portion 100*a* and the second transfer portion 100*b*, so that transfer accuracy improves. The air located in the vicinity of the associating mechanism 102 is discharged to the outside of the injection molding die 21 through an unshown air vent.

(Advantageous Effects)

In the cavity portion 100, the injection molding die 21 has the first gate portion 100*g*1 and the second gate portion 100*g*2 so that the first gate portion 100*g*1 and the second gate portion 100*g*2 substantially face each other, and the molten resins are simultaneously supplied to the cavity portion 100 from the first gate portion 100*g*1 and the second gate portion 100*g*2. Thus, the molten resins flow toward the central part of the cavity portion 100 from the first gate portion 100*g*1 and the second gate portion 100*g*2, i.e., from two directions. The head portions (flow front portions) of the molten resins associate with each other in the central part of the cavity portion 100. In this instance, the molten resins that come into contact with the fixing side bushing 26 are kept in a high-temperature state by, for example, the low-thermal-conductivity glass or the temperature adjustment media of the heating portion 103 (the temperature adjustment pipes 104 and the heater). Therefore, the head portions (flow front portions) of the molten resins associated in the central part of the cavity portion 100 are fused and then unified without separating. Therefore, it is possible to provide an injection molding method and an injection molding die capable of preventing the generation of weld grooves or circular untransferred portions resulting from air collected inside the cavity portion 100 and molding a high-precision optically functional surface even when an optical element such as the concave lens 1 having a high uneven thickness degree M of more than 4 is molded.

Furthermore, it is possible to mold a high-precision lens if a shape allows the transfer of up to half of the cavity portion 100 for one gate portion 100*g*1 (or the gate portion 100*g*2) in the cavity portion 100. For example, in a resin thin concave lens having a thinnest portion of 0.4 mm or less, it is possible to prevent the deterioration of optical characteristics caused by weld lines and prevent the deterioration of productivity. Moreover, the fixing side bushing 26 and the movable side bushing 40 are made of the low-thermal-conductivity materials, so that the drop of the temperature of the molten resins can be inhibited when the head portions of the molten resins associate, with each other. Thus, the weld lines can be eliminated, and a molded article without any weld grooves can be obtained.

Second Embodiment (Configuration)

The second embodiment is described with reference to FIG. 6, FIG. 7A, FIG. 7B, and FIG. 8. In the present embodiment, the differences between the first embodiment and the present embodiment are only described. The same parts as those in the first embodiment are provided with the same reference signs and are not described in detail.

Figure 7B:
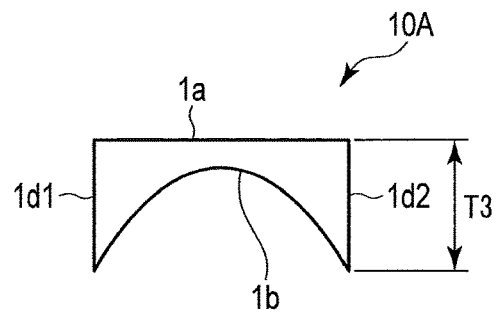
FIG. 7B is a sectional view taken along the 7B-7B line shown in FIG. 7A, and is a longitudinal sectional view showing the thickness of a lens circumferential portion of the concave lens.
Figure 8:
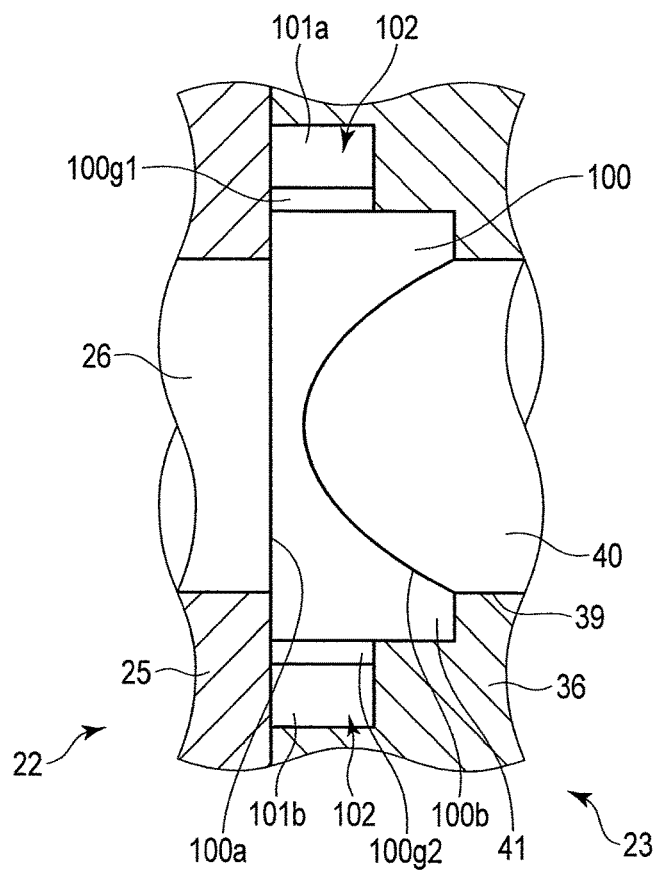
FIG. 8 is a longitudinal sectional view showing the configuration of the circumferential portion of the cavity portion of the injection molding die according to the second embodiment.

In a concave lens 10A, the uneven thickness degree M is 6 or more. As shown in FIG. 7B, T3 indicates the thickness of a circumferential part of a center portion of the concave lens 10A. T3/T1<6. The circumferential part of this concave lens 10A is formed by cutting two surfaces outside an optical effective region L1 indicated by a dotted line, as shown in FIG. 7A. Thus, two side surfaces 1*d*1 and 1*d*2 that are parallel to each other are formed.

In the present embodiment, the four cavity portions 100 are shaped to correspond to the concave lens 10A shown in FIG. 7A. The four fixing side bushings 26 and the four movable side bushings 40 are also shaped to correspond to the concave lens 10A shown in FIG. 7A. The cavity portions 100 are formed to correspond to the side surfaces 1*d*1 and 1*d*2 of the concave lens 10A. As shown in FIG. 7A, the side surfaces 1*d*1 and 1*d*2 are arranged in a direction that intersects at right angles with the inflow direction of the molten resins flowing into the cavity portion 100 from the first gate portion 100*g*1 and the second gate portion 100*g*2. Thus, as shown in FIG. 7B, it is assumed that the uneven thickness degree of the concave lens 10A as seen from the directions of the first gate portion 100*g*1 and the second gate portion 100*g*2 can be 6 or more. In other respects, the configuration is the same as that in the first embodiment.

(Functions and Advantageous Effects)

The molten resins are equally distributed to each of the cavity portions 100 from the runners 101*a* and 101*b*, and simultaneously supplied to each of the cavity portions 100 from the first gate portion 100*g*1 and the second gate portion 100*g*2 that substantially face each other. In this instance, the wall surfaces of the cavity portions 100 corresponding to the side surfaces 1*d*1 and 1*d*2 are formed in the direction that intersects at right angles with the inflow direction of the molten resins flowing into the cavity portion 100 from the first gate portion 100*g*1 and the second gate portion 100*g*2. Thus, the flow volumes of the molten resins flowing toward the side surfaces 1*d*1 and 1*d*2 can be lower. Therefore, the flow of the molten resins toward the central side of the cavity portion 100 from the side surfaces 1*d*1 and 1*d*2 side can be inhibited. As a result, the head portions of the molten resins flowing toward the central part of the cavity portion 100 from the first gate portion 100*g*1 and the second gate portion 100*g*2, i.e., from two directions can be associated with each other in the central part of the cavity portion 100. Therefore, even in the concave lens 10A having an uneven thickness degree of 6 or more, filling can be completed without any air being collected, and the weld lines can be eliminated.

Third Embodiment (Configuration)

The third embodiment is described with reference to FIG. 9 and FIG. 10. In the present embodiment, the differences between the first embodiment and the present embodiment are only described. The same parts as those in the first embodiment are provided with the same reference signs and are not described in detail. A convex lens 10B is thin, and the lens diameter is greater than the lens thickness. In the convex lens 10B, a thickness T11 of the lens center portion is greater than a thickness T12 of the lens outer circumferential part.

In the present embodiment, the four cavity portions 100 are shaped to correspond to the convex lens 10B in FIG. 10. The four fixing side bushings 26 and the four movable side bushings 40 are also shaped to correspond to the convex lens 10B in FIG. 10. In other respects, the configuration is the same as that in the first embodiment.

(Functions and Advantageous Effects)

The molten resins are equally distributed to each of the cavity portions 100 from the runners 101a and 101b, and simultaneously supplied to each of the cavity portions 100 from the first gate portion 100g1 and the second gate portion 100g2 that substantially face each other. Thus, the molten resins flow toward the central part of the cavity portion 100 from the first gate portion 100g1 and the second gate portion 100g2, i.e., from two directions, and the flow head portions (flow front portions) of the molten resins associate with each other in the central part of the cavity portion 100. In this instance, the molten resins that come into contact with the fixing side bushing 26 are kept in a high-temperature state by, for example, the low-thermal-conductivity glass or the temperature adjustment media of the heating portion 103 (the temperature adjustment pipes 104 and the heater), so that the heads (flow fronts) of the molten resins associated in the central part of the cavity portion 100 are fused and then unified without separating.

When the convex lens 10B in which the lens diameter is greater than the lens thickness is molded after the cavity portion 100 is filled with the molten resin, the viscosity of the molten resin filling the cavity portion 100 may rapidly increase. Therefore, the transfer pressure is not transmitted to the vicinity of the end of the cavity portion 100, and the shape may accuracy deteriorate. However in the present embodiment, the temperature adjustment pipes 104 heat the injection molding die 21, so that rapid cooling of the molten resin is prevented, and the molten resin is kept in a high-temperature state. The fixing side bushing 26 and the movable side bushing 40 are made of the low-thermal-conductivity materials, so that the decrease of the temperature of the molten resins that come into contact with the first transfer portion 100a and the second transfer portion 100b can be inhibited when the head portions of the molten resins associate with each other. Moreover, the cavity portion 100 is simultaneously filled with the molten resins from the first gate portion 100g1 and the second gate portion 100g2, so that the head portions can be associated with each other on the central line. The head portions (flow front portions) of the molten resins associated in the central part of the cavity portion 100 are fused and then unified without separating.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An injection molding method of supplying molten resins to a cavity portion and molding a concave lens which has an uneven thickness degree of four or more, wherein a thickness of a lens center portion of the lens is different from a thickness of a circumferential portion of the lens, the injection molding method comprising:
   a supply step of simultaneously supplying the molten resins to the cavity portion from two gate portions which are provided around the cavity portion and which are connected to the cavity portion; and
   an associating step of associating the molten resins supplied from the two gate portions in a central part of the cavity portion,
   wherein the supply step supplies the molten resins to the cavity portion from the two gate portions which substantially face each other around the cavity portion,
   wherein the associating step comprises at least one of: (i) simultaneously starting supply of the molten resins to the cavity portion from the two gate portions, and (ii) starting injection of the molten resins into the cavity portion from the two gate portions at a same injection rate,
   wherein opening areas of inlets of the two gate portions for the molten resins toward a cavity portion side are equal to each other, and the inlets are configured such that flow volumes and flow velocities of the molten resins toward the cavity portion side are equal to each other, and
   wherein the supply step comprises heating a molding portion in the cavity portion for an optical effective surface of the lens to a temperature of at least 30° C. higher than a glass transition point of the molten resins.

2. An injection molding die having a cavity portion to which molten resins in a high-temperature state are supplied to mold a concave lens which has an uneven thickness degree of 4 or more, wherein a thickness of a lens center portion of the lens is different from a thickness of a circumferential portion of the lens, the injection molding die comprising:
   two gate portions which are connected to the cavity portion and which simultaneously supply the molten resins to the cavity portion; and
   an associating mechanism which associates the molten resins supplied from the two gate portions in a central part of the cavity portion,
   wherein a molding portion in the cavity portion to mold an optical effective surface of the lens is formed by a bushing that uses glass as a low-thermal-conductivity material,
   wherein the two gate portions substantially face each other around the cavity portion,
   wherein the associating mechanism is configured to at least one of: (i) simultaneously start supply of the molten resins from the two gate portions to the cavity portion, and (ii) start injection of the molten resins from the two gate portions into the cavity portion at a same injection rate, wherein opening areas of inlets of the two gate portions for the molten resins toward a cavity portion side are equal to each other, and the inlets are configured such that flow volumes and flow velocities of the molten resins toward the cavity portion side are equal to each other, and wherein the cavity portion includes a molding portion for an optical effective surface of the lens that is heated to a temperature of at least 30° C. higher than a glass transition point of the molten resins.

* * * * *